United States Patent [19]

Kamphuis

[11] 4,070,766

[45] Jan. 31, 1978

[54] METHOD AND APPARATUS FOR PREPARING A SO-CALLED NON-CAKING POWDER

[75] Inventor: Gerrit George Kamphuis, Gorredijk, Netherlands

[73] Assignee: Stork Friesland B.V., Gorredijk, Netherlands

[21] Appl. No.: 722,054

[22] Filed: Sept. 9, 1976

[51] Int. Cl.² .................... F26B 7/00; F26B 19/00
[52] U.S. Cl. .......................................... 34/12; 34/10;
34/13; 34/60; 34/62
[58] Field of Search ............. 34/10, 12, 13, 57 R,
34/60, 62

[56] References Cited

U.S. PATENT DOCUMENTS

| | | | |
|---|---|---|---|
| 2,335,380 | 11/1943 | Bertram et al. | 34/12 |
| 2,912,768 | 11/1959 | Huston et al. | 34/57 R |
| 3,477,874 | 11/1969 | Repsdorph et al. | 34/10 |

Primary Examiner—John J. Camby
Attorney, Agent, or Firm—Haseltine, Lake & Waters

[57] ABSTRACT

Method and plant for preparing a non-caking powder by spray-drying a mixture of a concentrate of minimally 48% dry substance, such that in an uninterrupted drying operation the mixture is passed through the so-called sticky-zone, after which a subsequent cooling, rewetting and crystallization is performed, the latter three operations remaining spaced from said sticky-zone.

5 Claims, 5 Drawing Figures

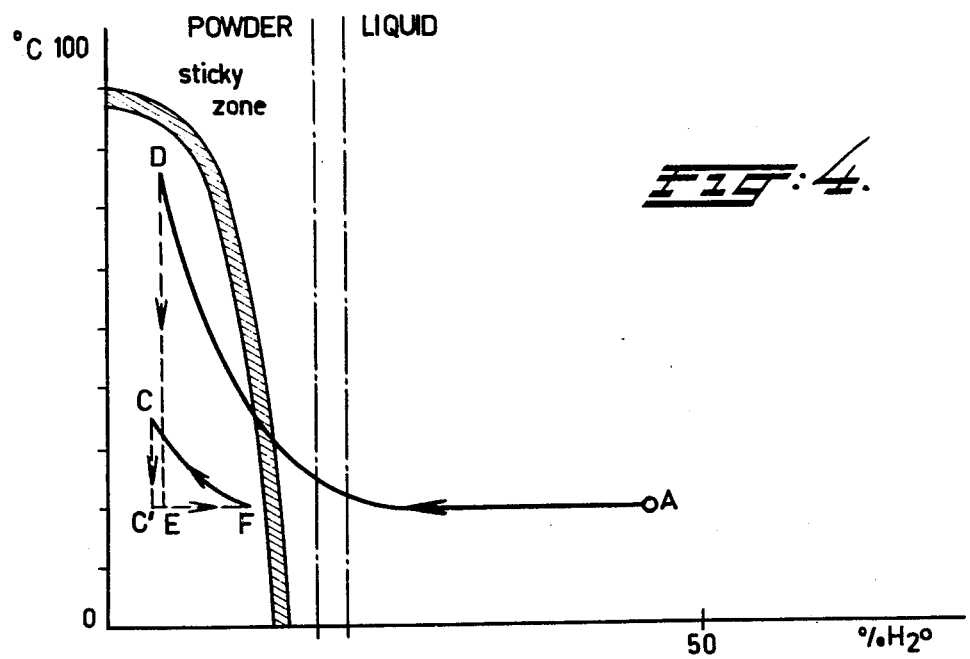
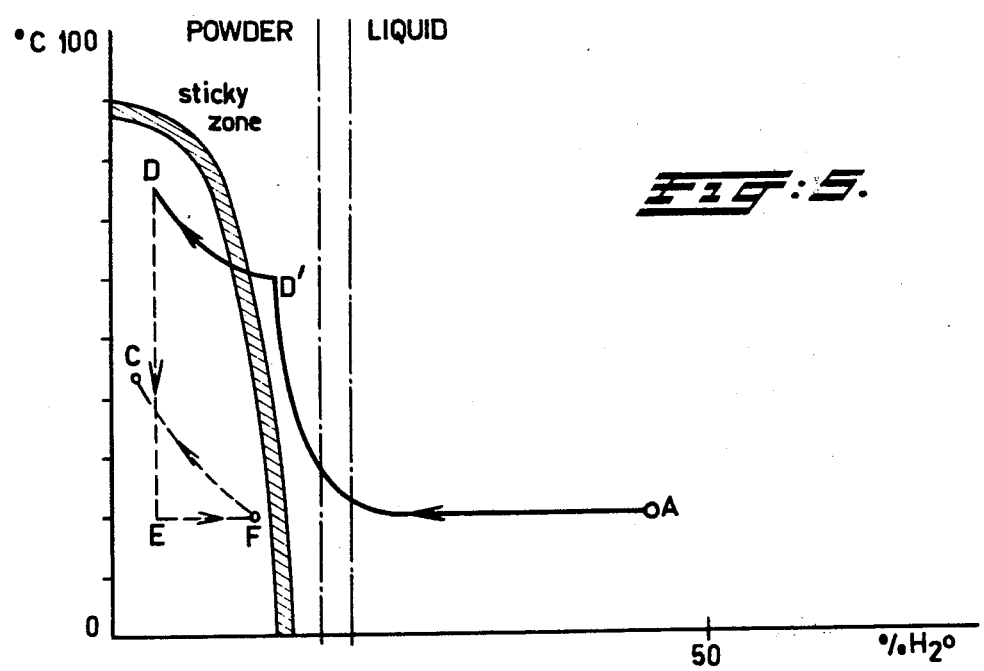

METHOD AND APPARATUS FOR PREPARING A SO-CALLED NON-CAKING POWDER

BACKGROUND OF THE INVENTION

The invention relates to a method for the preparation of a non-sticky (so-called non-caking) powder, whereby a concentrate of minimally 48% dry solids content is consecutively spray-dried in a tower and the dry product thus obtained is subjected, at a moisture content of at least 10%, to a crystallization, whereafter a final drying produces the end product. A problem which occurs when such methods for the preparation of a hygroscopic and/or thermoplastic product like whey powder are carried out, is the stickiness of the powder at the prevailing temperature and moisture. Starting from a solution of the indicated percentage dry solids content mentioned above, this solution is normally dried until an end moisture content not lower than 10% and preferably 12–14% is obtained, in other words: a dry solids content of maximally 90%.

In this so-called "wet-system" an after-crystallization and final drying are carried out. Thereby the final moisture content mentioned of at least 10% is necessary, so as to have sufficient moisture available to be bound as water of crystallization. In this system the earlier mentioned phenomenon of caking or building up of powder particles may happen, both in the drying tower and in the discharge channels of the dryer. This is caused by the high moisture content of the drying air. This can for instance be prevented by means of introducing extra drying air in these discharge channels.

Problems arise especially when using acid whey powder, that is to say, a powder of which a part of the lactose is converted into lactic acid. This latter powder is very hygroscopic and sticky. It has already for some time been attempted to convert acid whey into a powder, which is sufficiently loose, which flows easily, dissolves quickly, has a good flavor and can also be stored for a reasonable period without any caking occurring. Hitherto it was thought to be able to accomplish this by reducing the hygroscopic properties of the powder. The hygroscopic property can be reduced by converting the lactose into the crystallized d-hydrate form during operation as efficiently as possible. The known method did not meet the requirements mentioned hereinbefore satisfactorily.

SUMMARY OF THE INVENTION

The invention aims to improve the prior art method and to obtain an end product that complies with the usual requirement in practice, that is that the powder is in such a condition that it remains sufficiently free flowing and will not cake on being exposed to the ambient air.

These aims are being accomplished by performing the treatment in the spray-dry tower at a temperature higher than 60° C and by continuing until a final moisture content has been obtained, being below the level at which crystallization is possible and by thereafter cooling the obtained product and re-moistening same in a separate space up to a moisture content required for crystallization, whereafter a further crystallization and final drying take place.

Owing to these steps the "sticky-point" can be avoided as well as possible. The "sticky-point" is the point at which the powder particles become sticky and adhere easily to surfaces or to each other, resulting in a sticky mass. In connection herewith read the article by M. J. PALLANSCH: "New methods for drying acid whey" in Proceedings, Whey Products Conference Chicago, June 1962 US dept. of Agriculture.

The features of the invention consist in that:
a lower moisture content is applied in the tower at the higher temperature, and
a high moisture content is applied in the re-moisture chamber at a lower temperature.

It is convenient when cooling the powder obtained from the drying tower is performed up to a temperature lower than 35° and that re-moistening only takes place then.

After-crystallization is preferably carried out on a driven conveyor belt by means of which the desired residence time of the powder can be regulated.

The invention also relates to a plant for performing the method described above, which plant in a known way is provided with a spray-drying tower and a device for after-drying and after-cooling the powder. According to the invention an intermediate dryer, an after-cooler and a re-moisturizer for the powder are connected to the spray-drying tower, while the device for after-crystallization is only situated thereafter. As intermediate dryer a fluid bed or shaking bed dryer is preferably mounted.

BRIEF DESCRIPTION OF THE DRAWINGS

Some diagrammatical drawings and a graph will show the progress of the method and the structure of the plant.

FIGS. 4 and 5 give a picture of two further variants of the method according to the invention.

DISCUSSION OF THE PRIOR ART

Figure 1:
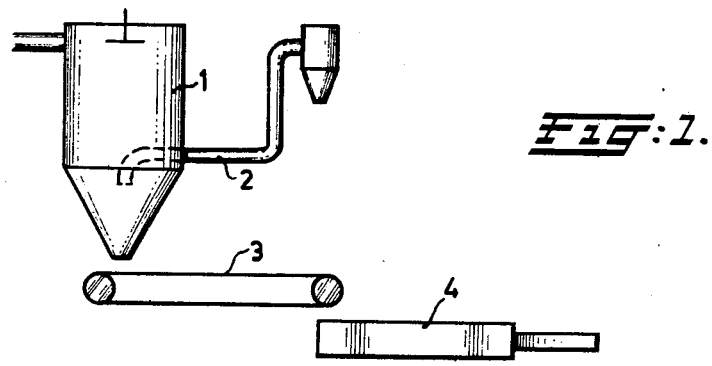
FIG. 1 shows a conventional plant.

As shown in FIG. 1 the conventional plant consists of a spray tower 1 which has been provided near the bottom with a supplementary supply of dry air 2.

The powder particles falling from the spray tower 1 usually fall on an endless belt 3 on which crystallization takes place. Finally the powder is introduced into an after-dryer 4 in which drying is performed up to the desired low moisture content of 3–4%. The progress of this known process is indicated with a dotted line A-B-C in FIG. 3 in which the abscissa represents the moisture content while the ordinate indicates the temperature.

DESCRIPTION OF PREFERRED EMBODIMENTS

Figure 2:
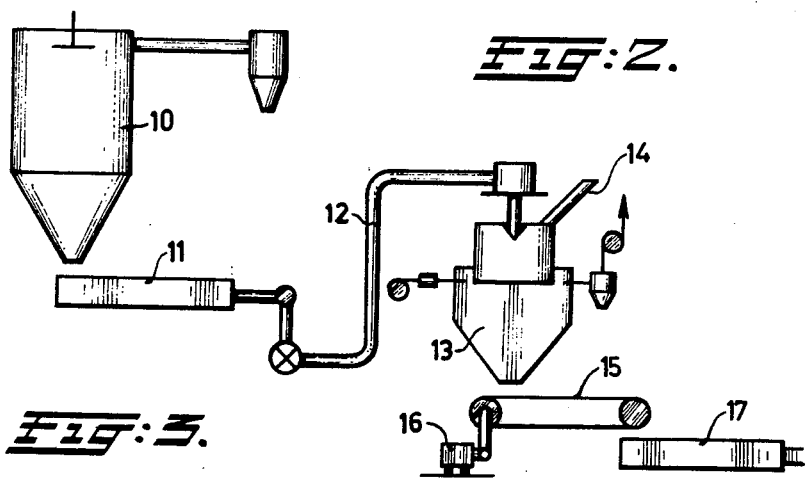
FIG. 2 represents the plant according to the invention in a similar way.
Figure 3:
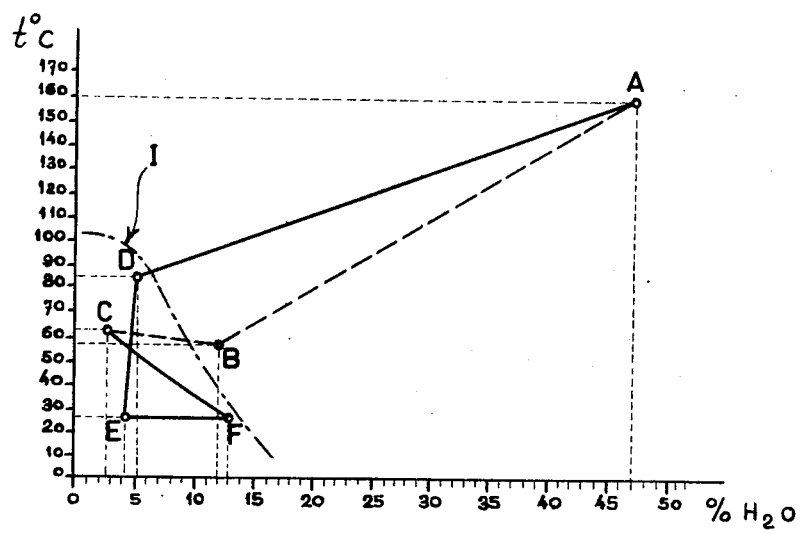
FIG. 3 graphically shows the progress of a known method and an embodiment of the invention.

The plant shown in FIG. 2 consists of a spray-tower 10 from which, by a correct choice of the quantity and temperature of the drying-gas, a powder is emitted at the bottom with a low moisture content e.g. amply 5%, which is less than the 10–12% from the plant according to FIG. 1. This is shown in the graph of FIG. 3 at points D and B respectively. These points are situated at opposite areas of a borderline I between a sticky area (right) and a non-sticky area (left). A shaker dryer 11 which acts as cooler and on which the temperature of the powder particles further falls to approx. 30°–20° C (see D-E in FIG. 3) is located underneath the spray-tower 10. Some drying is also effected herewith. The powder is subsequently transferred via a line 12 to a device 13 for remoistening the powder, in order to enable the intended crystallization (E-F in FIG. 3).

A steam supply 14 is present in remoisturizer 13, whilst nevertheless the treatment temperature is lower than the average temperature in spray tower 10. At the bottom (point F in FIG. 3) an endless belt 15 is placed on which further crystallization up to the α-hydrate takes place. This conveyor belt 15 is provided with a drive 16, permitting a regulation of the stay of the powder on the belt. Finally the product is transferred from belt 15 and introduced into an after-dryer 17, where a drying is effected up to the desired residual moisture of 2–4%. The progress of the entire operation is shown with a solid line A-D-E-F-C in the graph of FIG. 3. Cooler 11 can be executed as a fluid bed or a so-called shake bed.

Below, the example is described which also indicates an preparation of the concentrate to be dried:

Acid whey derived from so-called "cottage cheese" with a pH of 4.6 and a dry solids content of 55% was reduced by evaporization to 53% dry solids, cooled to 25° C, seeded with lactose seed crystal and kept under continuous stirring. After having been kept for 2 hours the concentrate was slowly cooled to 15° C over a period of 10 hours.

After 16 hours 75% of the lactose content was transformed into the crystallized α-hydrate. This concentrate was introduced into spray-dryer 10 (point A) and dried by spraying at an air-intake temperature of 160° C and an air-outlet temperature >60° C. e.g. 85° C (point D).

The powder from the tower had a total moisture content of less than 7.5% e.g. ample 5% and was subsequently cooled on the shake bed 11 to 25° C (D-E). This cooled powder was moisturized in a vessel 13 by means of stream up to 13–14% (point F). In this vessel air is introduced and exhausted again via the tower so as to remove the excess steam and to avoid any condensation on the walls. One remains in the area to the left of line I of the graph.

The temperature of this supplied air greatly influences the moisture absorption of the powder. Selecting the air temperature depends on the absolute moisture content prior to introduction into the re-moisturizing space and on the quantity of excess steam.

The powder from vessel 13 with a moisture content of 13% fell on conveyor belt 15 for a duration of 5 minutes. Thereafter the powder was dried on shake bed 17 up to a total residual moisture content of 4.25%. On exposure to ambient air of e.g. 70% relative moisture, this powder hardly stuck together and as a result the latter had very good non-caking properties.

In FIG. 4 a variant is given of the method diagrammatically shown in FIG. 3, as applied to a mixture of acid whey. The powder particles obtained in point C are further cooled from 34° C centigrade to about 20° centigrade. FIG. 5 shows a two stage initial drying operation of acid whey, the first stage ending at point D' on the right-hand side of the sticky-zone.

It should be noted that the invention is mainly elucidated with respect to the preparation of whey powder. The invention is, however, not limited to that method as the process described can also be carried out for drying other concentrates of hygroscopic and/or thermoplastic products, such as fruits, coffee and sugar, carbohydrate containing substances, respectively.

What I claim is:

1. A method for preparing a non-caking powder from a concentrate comprising spray-drying a concentrate having a minimum dry solids content of 48% at a temperature above 60° to form a powder having a moisture content below that at which crystallization is possible, cooling the powder to a temperature below 35° C., remoistening the cooled powder in a separate space to a moisture content at which crystallization is possible, allowing the remoistened powder to recrystallize and then drying the recrystallized powder to a final desired moisture content.

2. The method of claim 1 wherein the recrystallization takes place on a driven conveyor belt.

3. The method of claim 1 wherein the concentrate is a concentrate of acid whey, the minimum dry solids content of the concentrate is 92–95%, the moisture content of the spray-dried powder is 4–6%, the moisture content of the remoistened powder is 10–12% and the final moisture content is 1.5–2%.

4. An apparatus for preparing a non-caking powder from a liquid comprising a spray-dry tower having an inlet for the liquid and an outlet for dried powder, an intermediate dryer and cooler positioned to receive the dried powder from the spray-dry tower outlet, a remoisturizer for remoistening the cooled powder, means for transferring the cooled powder from said intermediate dryer and cooler to said remoisturizer, a device positioned to receive the remoistened powder from the remoisturizer for crystallization and an after-dryer positioned to receive the crystallized powder for final drying.

5. The apparatus of claim 4 wherein the intermediate dryer and the after-dryer consist of a fluid bed or a shake bed dryer.

* * * * *